Figure 3:
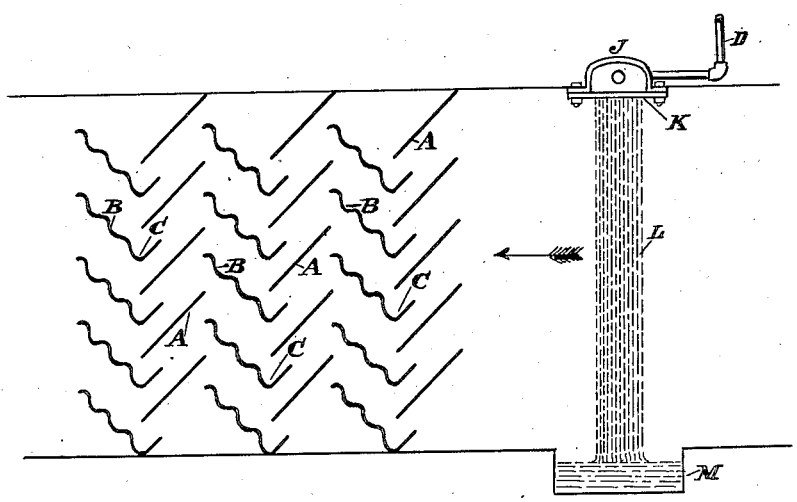

No. 813,217. PATENTED FEB. 20, 1906.
J. H. KINEALY.
AIR PURIFYING APPARATUS.
APPLICATION FILED MAR. 17, 1905.
2 SHEETS—SHEET 1.
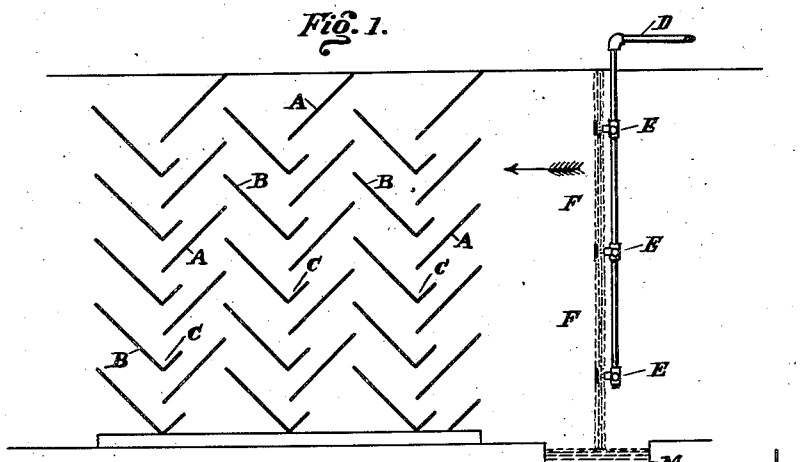
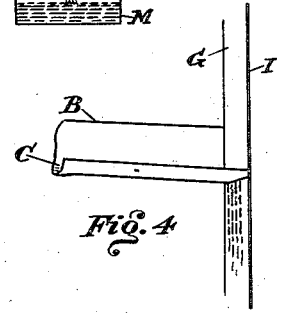
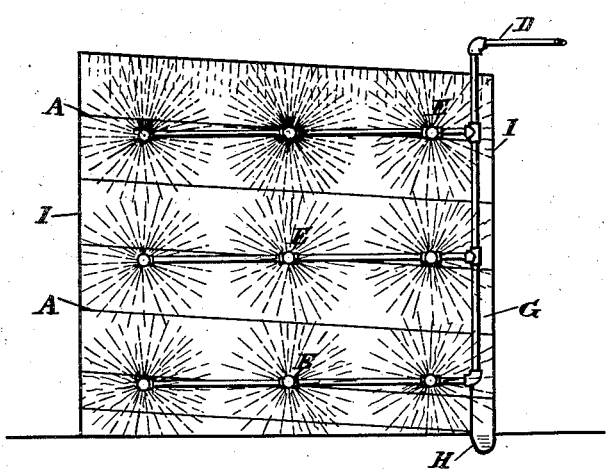
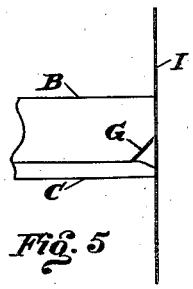
WITNESSES
INVENTOR
John H. Kinealy.

No. 813,217. PATENTED FEB. 20, 1906.
J. H. KINEALY.
AIR PURIFYING APPARATUS.
APPLICATION FILED MAR. 17, 1905.

2 SHEETS—SHEET 2.

WITNESSES
INVENTOR
John H. Kinealy.

UNITED STATES PATENT OFFICE.

JOHN H. KINEALY, OF FERGUSON, MISSOURI.

AIR-PURIFYING APPARATUS.

No. 813,217.  Specification of Letters Patent.  Patented Feb. 20, 1906.

Application filed March 17, 1905. Serial No. 250,654.

*To all whom it may concern:*

Be it known that I, JOHN H. KINEALY, a citizen of the United States, residing at Ferguson, county of St. Louis, State of Missouri, have invented a new and useful Improvement in Air-Purifying Apparatus, of which the following is a full, clear, and exact specification, reference being had to the accompanying drawings, which form a part thereof.

My invention relates to that type of air-purifying apparatus used in connection with heating and ventilating systems wherein the air is freed of impurities by being washed and then the moisture taken up by the air during the washing process is extracted from the air by means of a moisture-eliminator.

The object of my invention is to make the air supplied to buildings for ventilating purposes clean and sanitary by freeing it of impurities; and a further object of my invention is to prevent damage to furniture of schools and other ventilated buildings by avoiding the introduction of dust and dirt; and a still further object of my invention is to cool the air introduced for ventilating purposes in warm weather, so as to make the air inside of the building cooler than the air outside.

In its broadest form my invention consists of an apparatus for washing the air by making it come in contact with a body of water, thus removing the dust and dirt, and then drying the air by passing it through an eliminator consisting of deflecting-plates for alternately deflecting the air downward and upward, said deflecting-plates being slightly inclined to the horizontal in the direction of their length and the plates for deflecting the air upward being provided at their lower edges with gutters to carry away the water taken from the air.

In its best form my invention consists of an apparatus for washing the air by means of an air-washer having a passage for the air and a transverse wall of downward-falling water in a sprayed or finely-divided condition and then freeing the air of water by passing it through an eliminator consisting of deflecting-plates for alternately deflecting the air downward and upward, said deflecting-plates being slightly inclined to the horizontal in the direction of their length and the plates for deflecting the air upward being corrugated and provided at their lower edges with gutters to carry away the water taken from the air.

My invention is fully shown in the accompanying drawings, where similar letters are used to designate similar parts.

Figure 6:
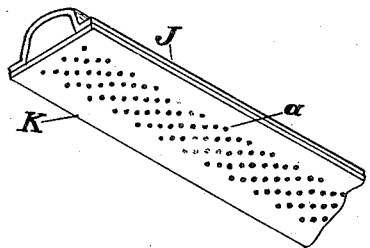

Figure 1 shows a form of my invention wherein the washer consists of a sheet or screen of water through which the air is blown and where the plates for deflecting the air upward are plane and not corrugated. Fig. 2 shows a view of the apparatus shown in Fig. 1 as seen by an observer standing in front of the washer and looking in the direction of the flow of the air through the apparatus. Fig. 3 shows the form of my invention which I prefer. Here the air is washed by being made to pass through what I term a "wall" of downward-falling water in a sprayed or finely-divided condition. The drops or streams of water fall vertically, but have spaces between them. The air in passing through this wall zigzags back and forth through the downward-falling streams, and it is not necessary to blow a hole through such a wall as it is when a sheet or screen of water is used. By making the wall of a proper thickness all of the air in its passage through it will be brought at some time or other in contact with the water and the air will be thoroughly washed and freed of dirt and impurities. Figs. 4, 5, and 6 show details of the apparatus.

In Figs. 1 and 2, A represents the plates for deflecting the air downward; B, the plates for deflecting the air upward; C, the gutters at the lower edges of the plates B for carrying away the water taken from the air; D, the pipe for supplying water to the washer; E, spray-nozzles for forming a sheet or screen of water; G, vertical gutters for carrying the water from the gutters C to the gutter H at the bottom of the eliminator; H, a gutter for carrying the water from the eliminator, and M a depression into which the water from the sheet F falls.

The spray-nozzles E must be put as close together as is necessary to form a continuous sheet or screen of water between the sides I, the top and bottom of the thoroughfare for the air.

The details of the gutters G are shown in Figs. 4 and 5. There is one of these gutters at the lower ends of each series of upward-deflecting plates, so that the water flows from the gutters C into this vertical gutter G, which is formed by means of a vertical strip attached to the side I of the thoroughfare for the air. This vertical strip prevents the water from being blown through the eliminator with the air, and it may be put either in front of or back of the end of the gutter C, although in the figures it is shown placed back of C. Fig. 4 shows a vertical view, and Fig. 5 a plan, of this gutter and its connection to the gutter C.

In Fig. 3, A represents the plates for deflecting the air downward; B, the corrugated plates for deflecting the air upward; C, the gutters at the bottom of the plates; D, the pipe for supplying the water to the washer; J, a spray-box having a perforated bottom K, through which the water passes downward, forming a wall L of downward-falling water in a finely-divided state, and M is a depression into which the water drops.

Fig. 6 shows an enlarged view of the spray-box J and the perforated bottom K. This bottom has a number of fine holes a.

The operation of the apparatus is as follows: When the air is blown or drawn through the apparatus, it comes in contact with the sheet of water F or the wall of water L and is freed of dirt and other impurities. The air then passes to the eliminator, where it strikes the first row of the plates A, by which it is deflected downward. The air strikes the bottom of these plates and by rubbing on their surfaces is made to deposit some of the moisture. This moisture drops off the lower edges of the plates A into the gutters of the plates B. After the air has passed the first row of downward-deflecting plates it strikes the surface of the first row of upward-deflecting plates B. Here a part of the moisture is taken from the air, and since these plates are inclined to the horizontal in the direction of their length this moisture runs down the plates toward their lower ends. If the plates B are not corrugated the water will run down into the gutters C, whereas if they be corrugated some of the water will run lengthwise of the plates toward their lower ends in the corrugations. The corrugations on the plates B tend to prevent water which may be deposited on them from being blown upward and over the top edges, and they also aid in freeing the air of moisture by presenting irregularities upon which the air impinges. The air continues thus in its passage through the eliminator, being alternately deflected downward and upward and being freed of moisture by being made to come in contact with the deflecting-plates A and B. The water taken from the air runs to the lower ends of the plates B and from there runs down the gutters G into the gutter H, by which it is led either to the depression M or to some place outside of the eliminator.

The advantage of the form of eliminator here shown is that the air entering the eliminator is divided into horizontal strata, and each strata is treated independent of those above or below. In the case of eliminators having vertical deflecting-plates, the moisture taken from the air at the upper part of the eliminator runs along the vertical plates toward the bottom and comes in contact with the air flowing through the lower part of the eliminator. The result is that in such forms of eliminators the air at the lower part is contaminated by the water and coarser particles of dust and dirt taken from the air at the upper part of the eliminator.

Washing the air cools it, so that by using cold or cool water in the washer in warm weather the air may be cooler when leaving the apparatus than when entering, and thus the air supplied to a building for ventilating purposes may be made cooler than the air outside.

In the drawings I have shown three series of plates for deflecting the air downward and three series for deflecting the air upward; but the number of the plates may be varied to suit the conditions, and the thoroughfare may be made of any suitable material and its size and shape may be varied to suit each particular case. The thickness of the wall L of water for washing the air and the number, arrangement, and size of the holes in the perforated plate K of the spray-box J may be varied to suit the requirements of each particular case.

What I claim as new, and desire to secure Letters Patent for, is—

1. In an air-purifying apparatus, an air-washer, and a water-eliminator consisting of deflecting-plates for alternately deflecting the air downward and upward, said deflecting-plates being slightly inclined to the horizontal in the direction of their length, and the plates for deflecting the air upward being provided at their lower edges with gutters to carry away the water, substantially as described.

2. In an air-purifying apparatus, an air-washer consisting of a thoroughfare for the air and a transverse wall of vertically-dropping water in a sprayed or finely-divided condition, and a water-eliminator consisting of deflecting-plates for alternately deflecting the air downward and upward, said deflecting-plates being slightly inclined to the horizontal in the direction of their length, and the plates for deflecting the air upward being provided with gutters at their lower edges to carry away the water, substantially as described.

3. In an air-purifying apparatus, an air-washer, and a water-eliminator consisting of deflecting-plates for alternately deflecting the air downward and upward, said deflecting-plates being slightly inclined to the horizontal in the direction of their length, and the plates for deflecting the air upward being corrugated in the direction of their length and provided at their lower edges with gutters to carry away the water, substantially as described.

4. In an air-purifying apparatus, an air-washer consisting of a thoroughfare for the air and a transverse wall of downward-falling water in a sprayed or finely-divided condition, and a water-eliminator consisting of deflecting-plates for alternately deflecting the air downward and upward, said deflecting-plates being slightly inclined to the horizontal in the direction of their length, and the plates for deflecting the air upward being corrugated in the direction of their length and provided at their lower edges with gutters to carry away the water, substantially as described.

5. In an air-purifying apparatus, an air-washer consisting of a thoroughfare for the air and a transverse wall of downward-falling water in a sprayed or finely-divided condition, and a water-eliminator consisting of deflecting-plates for alternately deflecting the air downward and upward, said deflecting-plates being slightly inclined to the horizontal in the direction of their length, the plates for deflecting the air upward being corrugated in the direction of their length and provided at their lower edges with gutters to carry away the water, and means for carrying from the eliminator the water flowing from the gutters of said upward-deflecting plates, substantially as described.

6. In an air-purifying apparatus, a thoroughfare for the air, a spray-box arranged transversely to the thoroughfare at the top thereof, a pipe for supplying water to the spray-box, deflecting-plates for alternately deflecting the air downward and upward, said deflecting-plates being slightly inclined to the horizontal in the direction of their length, the plates for deflecting the air upward being corrugated in the direction of their length and provided at their lower edges with gutters to carry away the water, and means for carrying from the eliminator the water flowing from the gutters of said upward-deflecting plates, substantially as described.

7. In an air-purifying apparatus, a thoroughfare for the air, a spray-box arranged transversely to the thoroughfare at the top thereof, a pipe for supplying water to said spray-box, deflecting-plates for alternately deflecting the air downward and upward, said deflecting-plates being slightly inclined to the horizontal in the direction of their length, the plates for deflecting the air upward being provided at their lower edges with gutters to carry away the water, and means for carrying from the eliminator the water flowing from the gutters of said upward-deflecting plates, substantially as described.

In testimony whereof I have signed my name to this specification in the presence of two subscribing witnesses.

JOHN H. KINEALY.

Witnesses:
BEN BLUHM,
LILLIE MAURER.